United States Patent Office 3,166,576
Patented Jan. 19, 1965

3,166,576
PROCESS FOR THE PREPARATION OF
ROSE OXIDE
Richard L. Markus, Montclair, N.J., assignor to Stepan
Chemical Company, Maywood, N.J., a corporation of
Delaware
No Drawing. Filed June 11, 1963, Ser. No. 286,907
13 Claims. (Cl. 260—345.1)

This invention relates to novel processes for the preparation of certain perfume constituents. More particularly this invention relates to novel processes for the preparation of the compounds cis and trans 2-(2'-methyl-1'-propenyl) - 4 - methyltetrahydropyran commonly called Rose Oxide.

Rose Oxide is a compound which has found widespread use in the perfume industry because of its pleasant odoriferous nature. It is obtained naturally as an extract from Bulgarian rose oil and Geranium bourbon. The source of these raw materials are limited, their costs are extremely high, and the necessary extraction and purification procedures which need be followed to obtain the desired end product are elaborate, costly and time consuming. As a consequence, much time and effort has been spent in attempts to synthesize these compounds. However, these attempts have generally resulted in time consuming, tedious and costly procedures which result in poor yields of the desired end product. Moreover, because of the difficulty inherent in these techniques and the poor yields obtained, commercial production of Rose Oxide by means of organic synthesis is an extremely costly operation not generally employed in the perfume industry.

For example, it has been proposed to irradiate citronellyl acetate in the presence of humid oxygen for a period of 56 hours. The hydroperoxides thus formed are reduced with a mildly alkaline solution of sodium sulfite. The reaction mixture is then agitated for a period of 27 hours and extracted with petroleum. The petroleum extract is washed and distilled and the crude oxidation product thus obtained is then hydrolyzed with potassium hydroxide in a methanol solution and refluxed for about 1½ hours. The diol obtained is then emulsified with a dilute sulfuric acid solution and Rose Oxide is obtained in poor yield by distillation of the emulsion.

In another prior art procedure, citronellyl acetate is refluxed with carbon tetrachloride and N-bromosuccinimide to form 4-bromo-citronellyl acetate. Lithium chloride is then dissolved in hot dimethylformamide which after cooling is added to a mixture of lithium carbonate and the bromo-citronellyl acetate previously prepared. This mixture is then refluxed under nitrogen for 9 hours and after quenching in ice water, a small yield of the dehydrocitronellyl acetate is obtained upon extraction. The main fraction is then hydrolyzed with potassium hydroxide in a mixture of methanol and water for 16 hours under a nitrogen atmosphere. An intermediate product is recovered by distillation which is then dissolved in absolute benzene and refluxed with crystalline para-toluenesulfonic acid for two hours. Upon cooling, extraction, neutralizing and drying, a Rose Oxide mixture is obtained in poor yield.

Another prior art procedure involves oxidizing beta-citronellol by ultra-violet radiation in the presence of oxygen. The hydroperoxides thus formed are reduced with sodium sulfite which in a cool acetic acid solution undergoes allylic rearrangement and dehydration to obtain the Rose Oxide in poor yield.

It is the primary object of this invention to provide a simple procedure for the preparation of Rose Oxide in good yields. Another object of this invention is to provide a single operational step process for the preparation of Rose Oxide whereby the desired compound may be recovered directly from the reaction medium by conventional means. It is a further object of this invention to provide a simple organic synthesis using readily available materials for the preparation of Rose Oxide. These and further objects will be apparent from the following detailed description.

As indicated previously, Rose Oxide is the common name given to the mixture of cis and trans 2-(2'-methyl-1'-propenyl)-4-methyltetrahydropyran and when the term Rose Oxide is used in the specification and claims, it will be understood to refer to this mixture.

According to this invention, cis and trans 2-(3'-methyl-1'-propenyl)-4-methyltetrahydropyran is prepared by a process which comprises reacting a lower aliphatic carboxylic acid with citronellol or citronellyl acetate in the presence of an allylic oxidizing agent thereby causing an allylic rearrangement in an alpha position to the double bond in the citronellol or citronellyl acetate to take place thereby forming an intermediate compound which spontaneously cyclizes, neutralizing said cyclized compound with a soluble alkali to form said methyltetrahydropyran and recovering said methyltetrahydropyran from the reaction medium.

While Rose Oxide may be produced by reacting either citronellol or citronellyl acetate with the allylic oxidizing agent under the conditions to be described in greater detail hereinafter, citronellol is the preferred reactant since it produces Rose Oxide in greater yields without the formation of as many undesirable byproducts. While citronellyl acetate may be employed as an initial reactant, its use reduces the amount of Rose Oxide formed in the reaction and causes an increase in the formation of the undesirable acetate ester intermediates. The expression "a citronellol compound" will be used to mean either the citronellol or citronellyl acetate in the specification and claims.

The allylic oxidizing agent may be of the type which causes either allylic acetoxylation or allylic hydroxylation to take place in an alpha position to the double bond in the citronellol or citronellyl acetate. Depending upon the procedure employed, an intermediate hydroxy compound or acetoxy compound is formed which under the conditions of the reaction, spontaneously dehydroxylates or deacetoxylates and cyclizes to form the Rose Oxide.

Thus, in one embodiment of this invention, Rose Oxide may be prepared by a process which comprises reacting a lower aliphatic carboxylic acid with a citronellol compound in the presence of a metal oxide which reacts in situ with said carboxylic acid to form an allylically oxidizing metal salt thereby causing allylic acetoxylation in an alpha position to the double bond in the citronellol compound to take place thereby forming an intermediate compound which spontaneously deacetoxylates and cyclizes to form the desired Rose Oxide, neutralizing the cooled reaction medium and recovering the Rose Oxide therefrom.

While not wishing to be bound by any theory, it is believed that the reaction involved may be illustrated by the following equation using acetic acid and citronellol as the initial reactants and lead tetroxide which reacts in situ with the acetic acid to form lead tetraacetate as the allylic oxidizing agent.

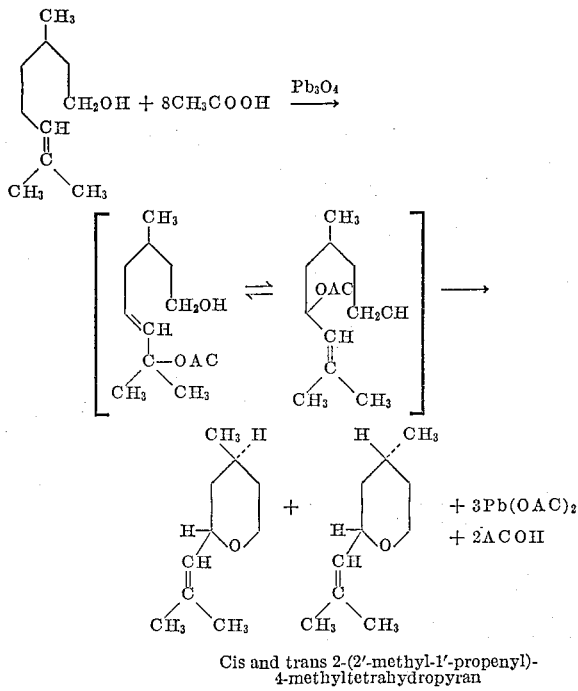

Cis and trans 2-(2'-methyl-1'-propenyl)-4-methyltetrahydropyran

The intermediate compound formed is believed to be 2-acetoxy-2,6-dimethyl-3-octene-8-ol. This intermediate spontaneously deacetoxylates and cyclizes to form the Rose Oxide.

In carrying out the above described reaction, the acetic acid serves not only as a reagent for the formation of lead tetraacetate but also serves as a solvent for the reagents. Thus the amount of acetic acid may vary from about 6 to 15 times the amount of citronellol or citronellyl acetate employed on a molar basis. While acetic acid is preferred as a reactant, other lower aliphatic carboxylic acids having between 1 and 6 carbon atoms such as propionic and butyric acids may be used. In addition, the higher oxides of iron, tin, copper, thallium, bismuth, antimony or selenium may be used in place of lead tetroxide (red lead) or lead dioxide, although I prefer to employ lead tetroxide because of the convenience of forming lead tetraacetate in situ in the reaction, and the particular acceptability of this compound as an allylic oxidizing reactant. The lead tetroxide or other higher oxides of the above mentioned metals are employed in approximately equimolar quantities. When other lower carboxylic acids are employed in place of acetic acid, the corresponding oxidizing lead salts are formed as oxidizing agents. Likewise when other metal oxides are employed in place of lead tetroxide ($Pb_3O_4$), corresponding oxidizing metal salts are formed as oxidizing agents.

The terms acetoxylate or deacetoxylate are to be construed as meaning the addition or elimination of an organic fatty acid in the specification and claims. It is used in a specific sense when acetic acid is employed and in a generic sense when other lower carboxylic acids are employed in the reaction.

In carrying out this reaction, I have found that the reaction is expedited when air or oxygen is introduced into the reaction medium. I have found that the formation of lead tetraacetate from lead tetroxide and acetic acid is catalyzed in the presence of air or oxygen and consequently materially increases the rate of the reaction. The flow of oxygen or air is maintained from about 1 to 800 milliliters per minute per mol of citronellol or citronellyl acetate. I have found that optimal results are obtained when the rate of flow is maintained at about 100 milliliters per minute per 0.2 mol of citronellol or citronellyl acetate. The term "oxygen containing gas" is intended to cover oxygen or air which are used interchangeably in the specification and claims since either may be employed in the reaction. While the reaction proceeds without the introduction of air or oxygen into the reaction medium, the reaction rate is slower and the reaction time is prolonged. The reaction will not take place in the absence of air such as when a blanket of nitrogen or carbon dioxide is employed.

The acetic acid may be added to the reaction medium from ambient temperature up to about 90° C. although I have found it particularly advantageous to maintain the reaction temperature at about 60–70° C. and preferably at about 65 to 68° C. during the addition of the acetic acid. While the acetic acid may be added over a period of about 5 minutes to about 6 hours, I have found it particularly advantageous to add the acetic acid over a period of about 15 to 60 minutes in order to obtain the best results. The time of the addition of the acetic acid actually determines the rate of the reaction and the reaction temperature. Prior to the addition of the acetic acid, the reaction temperature is brought preferably to about 65° C. At this point, heating is discontinued. The reaction is moderately exothermic and the temperature is maintained at about 65° C. by addition of acetic acid. The rate of addition is such as to maintain this temperature. As the temperature rises above about 68° C., the addition of acetic acid is temporarily stopped until the temperature decreases again to about 65° C. After addition of about half of the acetic acid, the exothermic reaction is not sufficient to maintain the temperature at about 65–68° C. and heat has to be applied. The heating is continued until such time as the red lead is dissolved, which reaction is generally completed in about ¼ to 6 hours time. When oxygen is introduced into the reaction medium, the reaction is generally completed in about 15 minutes to 2½ hours. During the course of the reaction, the lead tetroxide reacts with the acetic acid to form soluble lead tetraacetate which upon reduction forms equally soluble lead diacetate. The end point of the reaction may be determined by the disappearance of the red lead indicating the formation of the soluble lead tetraacetate. The end point also may be determined by testing the medium against a potassium iodine-starch paper and if the test proves to be negative, the heating is discontinued. The reaction medium is allowed to cool and diluted with two or three times its initial volume of water. The medium is then neutralized to a pH of about 5–7, preferably to a pH of about 6, with any soluble alkali such as potassium hydroxide, sodium carbonate, potassium carbonate, ammonia, etc. I prefer to employ sodium hydroxide as the neutralizing agent.

The addition of water causes the formation of an oil layer and an aqueous layer. The oil layer is separated from the aqueous layer and contains a mixture of the desired Rose Oxide in good yield, citronellol and/or citronellyl acetate. The Rose Oxide is separated from the citronellol and/or citronellyl acetate by fractional distillation at a temperature of about 70–75° C. and at a pressure of about 15 millimeters of mercury. After separation of the Rose Oxide from the mixture containing citronellol or citronellyl acetate, the citronellol is reused as the initial reactant in the next batch. If a substantial amount of citronellyl acetate has been formed during the reaction, the acetate has to be hydrolyzed in a conventional manner to the citronellol before the material can be reused as an initial reactant in the next batch.

While the acetic acid or other lower aliphatic carboxylic acids may serve as both diluent and reactant in the process, I have found that lower aliphatic alcohols or aromatic hydrocarbons may be substituted instead for that part of the acetic acid or lower carboxylic acids used as solvent. Thus, hexane, benzene, toluene, xylene, tetrahydrofurane, methanol, ethanol, propanol, etc. may be used as a solvent to replace that portion of the acetic acid or other lower aliphatic carboxylic acid that is employed as the solvent.

While the various processing conditions may vary over wide ranges, I have found it desirable to maintain the conditions within the preferred limits specified because of adverse effects upon the yield of Rose Oxide if conditions other than the preferred conditions are employed. For example, it has been found that a rise of about 5° C. in temperature during the addition of the acetic acid to the reaction medium will cause a loss in Rose Oxide and an increase in citronellyl acetate. A lower temperature has been found to decrease the yield of Rose Oxide and increase the amount of citronellol recovered. The addition of acetic acid outside the time specified increases the formation of citronellyl acetate. A reduction in the amount of lead tetroxide employed has been found to lower the yield of Rose Oxide and increase the amount of citronellol recovered. A reversal of the addition of the reagents, simultaneous addition of the reagents, or a gradual increase of temperature to optimal, all lead to inferior yield of Rose Oxide. Likewise the omission of air results in reduced yield of Rose Oxide.

In another embodiment of this invention, the citronellol or citronellyl acetate may be reacted with a lower aliphatic carboxylic acid in the presence of an allylic oxidizing agent which causes allylic hydroxylation in an alpha position to the double bond in the citronellol compound to take place thereby forming an intermediate compound which spontaneously dehydroxylates and cyclizes and which upon neutralization with a soluble alkali yields Rose Oxide which may then be recovered from the reaction medium.

While not wishing to be bound by any theory, it is believed that the reaction involved may be illustrated by the following equation using acetic acid and citronellol as the initial reactants, tertiary butyl hydroperoxide as the oxidizing agent and cuprous chloride as a catalyst to initiate the decomposition of the tertiary butyl hydroperoxide.

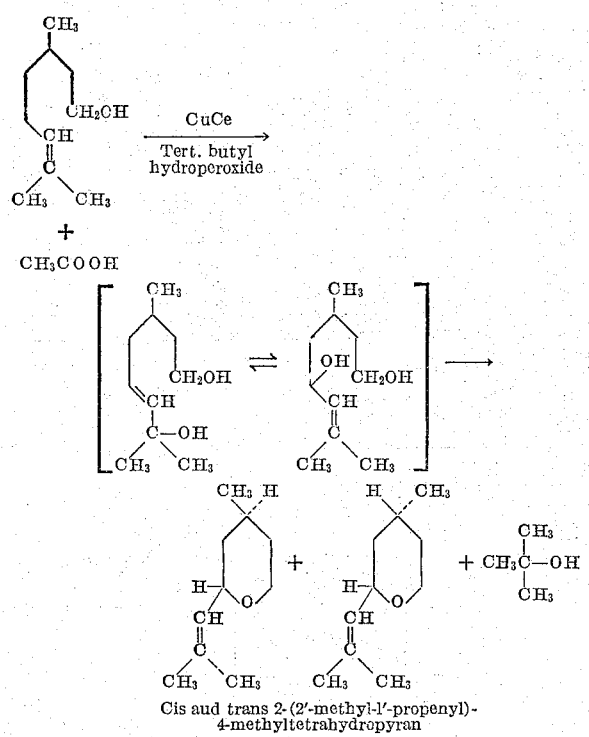

Cis and trans 2-(2'-methyl-1'-propenyl)-4-methyltetrahydropyran

The intermediate formed by this reaction is believed to be 2,8-dihydroxy-2,6-dimethyl-3-octene. This compound spontaneously dehydrates and cyclizes under the conditions of the present reaction to the desired Rose Oxide.

While acetic acid is the preferred lower carboxylic acid employed in the reaction, other aliphatic carboxylic acids having between 1 to 6 carbon atoms such as propionic or butyric acids may be used. The carboxylic acid functions as both a solvent and as a reactant, much in the same manner as in the embodiment previously described. The carboxylic acid may be employed in amounts of from 1 to 5 mols per mol of citronellol. Since the cuprous chloride functions as a catalyst, it is employed in molar quantities of about 1/100 to about 1/20 of the amount of citronellol or citronellyl acetate.

Lower aliphatic alcohols and aromatic compounds such as benzene, toluene, xylene, etc., may be employed as solvents in this reaction to replace that part of the carboxylic acid which is employed as a solvent.

The oxidizing agent may be any compound derived from metallic salts and sources of free tertiary butoxy radicals such as tertiary butyl peracetate, tertiary butyl hydroperoxide, tertiary butyl hypochlorite, etc.

In carrying out this embodiment of the process, the carboxylic acid may be added to the citronellol compound from ambient temperature up to about 90° C. although I have found it preferable to add the carboxylic acid and the cuprous chloride at about 65° C. The oxidizing agent such as tertiary butyl hydroperoxide is preferably added to the reaction mixture at about 65 to 68° C. and I have found that the best results are obtained when all of the oxidizing agent is added to the reaction mixture at substantially the same time or within a small increment of time such as one minute. After addition of the oxidizing agent, the mixture is heated gradually to about 60–90° C., and preferably to about 80° C. The temperature is maintained at this point for about 1 to 5 hours and preferably for about 3 hours. The reaction mixture is then permitted to cool.

In carrying out this reaction, I have found that the reaction is expedited when an oxygen containing gas such as air or oxygen is introduced into the reaction medium. The flow of oxygen is maintained from about 1 to 800 milliliters per minute per mol of citronellol compound. I have found that optimal results are obtained when the rate of flow is maintained at about 100 milliliters per minute per 0.2 mol of citronellol compound.

Upon cooling, the mixture is neutralized with a dilute alkali such as potassium hydroxide, potassium carbonate, ammonia etc. although I prefer to employ sodium hydroxide. The neutralization is continued until a pH of about 7 is obtained. The neutralization causes the formation of an oil phase and a water phase with the Rose Oxide being present in the oil phase. The oil phase is separated from the aqueous phase and contains a mixture of the desired Rose Oxide, citronellol and/or citronellyl acetate. Rose Oxide is separated by fractional distillation at a temperature of about 70–75° C. at about 15 millimeters of mercury. The citronellol may be reused in the next batch. If however it is substantially contaminated with citronellyl acetate, the acetate may be first hydrolyzed by conventional means to the citronellol.

The invention may be illustrated by reference to the following examples in which it will be obvious to those skilled in the art that many modifications are possible without departure from the spirit and scope of this invention.

EXAMPLE 1

Through a warm stirred suspension of 460 g. (0.67 mol) of $Pb_3O_4$ in 124.8 g. (0.8 mol) of citronellol, air was bubbled at the rate of 400 ml./min. The temperature of the system was maintained at 65° C. and glacial acetic acid 580 g. (9.66 mol) was introduced within about one half hour period of time. Thereupon heating was continued for about another half hour until the red lead dissolved and the test against KI-starch paper turned out to be negative. Upon cooling, dilution with water and neutralization, the oil layer was separated yielding an oil (78.5 g.) consisting of Rose Oxide (26.3%) and recoverable citronellol (71.7%) besides citronellyl acetate (3.61%) as determined by gas chromatography and fractional distillation.

The following examples were carried out according to the general procedure set forth in Example 1 above.

EXAMPLE 2

To a mixture of 31.2 g. of citronellol of 65% purity and 217.5 g. of lead tetroxide was added 225 cc. of propionic acid. Upon completion of the reaction and after cooling, dilution with water and neutralization, Rose Oxide was recovered from the reaction medium.

EXAMPLE 3

To a mixture of 31.2 g. of citronellol of 65% purity and 145 g. of lead tetroxide was added 20 ml. of acetic acid and 30 cc. of N-propanol. Upon completion of the reaction and after cooling, dilution with water and neutralization, Rose Oxide was recovered from the reaction medium.

EXAMPLE 4

To a mixture of 31.2 g. of citronellol of 65% purity and 115 g. of lead tetroxide was added 138 cc. of acetic acid and 200 cc. of benzol. Upon completion of the reaction and after cooling, dilution with water and neutralization, Rose Oxide was recovered from the reaction medium.

EXAMPLE 5

To a mixture of 31.2 g. of citronellol of 65% purity and 115 g. of lead tetroxide was added 138 cc. of acetic acid and 16 cc. of methanol. Upon completion of the reaction and after cooling, dilution with water and neutralization, Rose Oxide was recovered from the reaction medium.

EXAMPLE 6

To a mixture of 31.2 g. of citronellol of 65% purity and 115 g. of lead tetroxide was added 131 cc. of acetic acid and 32 cc. of ethyl alcohol. Upon completion of the reaction and after cooling, dilution with water and neutralization, Rose Oxide was recovered from the reaction medium.

EXAMPLE 7

A number of experiments were conducted using various processing conditions. The reactants employed and processing conditions used are set forth in Table I below:

the Rose Oxide formation as the amount of air is (1) more than preferred and (2) is discontinued after a period of time.

EXAMPLE 8

To a stirred mixture of citronellol (31.2 g.; 0.2 mol), acetic acid (48 g., 0.8 mol) and cuprous chloride (1.0 g.; 0.01 mol) was added at 65° C., tertiary butylhydroperoxide (70%, 25.7 g.; 0.2 mol) within one minute. The mixture was heated up gradually to 80° C. and kept at that temperature for 3 additional hours. Upon cooling, the mixture was neutralized with dilute NaOH solution to pH 7. An oil layer yielding 24.82 g. oil consisting of 13.2% Rose Oxide, and 40.7% recoverable citronellol was recovered.

The following examples were carried out according to the general procedure set forth in Example 8 above.

EXAMPLE 9

To a mixture of 31.2 g. of citronellol, 1 g. of cuprous chloride and 25.7 g. of tertiary butyl hydroperoxide of 70% purity was added 45.7 cc. of acetic acid. Upon completion of the reaction and after cooling, dilution with water and neutralization, Rose Oxide was recovered from the reaction medium.

EXAMPLE 10

To a mixture of 31.2 g. of citronellol, 1 g. of cuprous chloride and 25.7 g. of tertiary butyl hydroperoxide of 70% purity was added 45.7 cc. of acetic acid. Air was introduced into the reaction medium at a rate of 100 cc. per minute. Upon completion of the reaction and after cooling, dilution with water and neutralization, Rose Oxide was recovered from the reaction meduim.

EXAMPLE 11

To a mixture of 31.2 g. of citronellol, 1 g. of cuprous chloride and 35.2 g. of tertiary butyl peracetate was added 45.7 cc. of acetic acid. Upon completion of the reaction and after cooling, dilution with water and neutralization, Rose Oxide was recovered from the reaction medium.

Having thus provided a written description of the present invention and provided specific examples thereof, it should be understood that no undue restrictions or limitations are to be imposed by reason thereof but that the present invention is defined by the appended claims.

I claim:

1. A process for preparation of Rose Oxide which comprises reacting a saturated, unsubstituted lower aliphatic carboxylic acid with a citronellol compound in the presence of a compound selected from the group consisting of lead tetroxide, tertiary butyl hydroperoxide and tertiary butyl peracetate thereby causing an allylic rear-

*Table 1*

| Expt. No. | Citronellol, g. | Red Lead, g. | Acetic Acid, cc. | Flow Rate $O_2$ or Air, Temp. | Total Reaction Time | Crude Yield, g. | Percent R.O. | Citr. Acetate, Percent | Citr., Percent |
|---|---|---|---|---|---|---|---|---|---|
| 1 | 15.6 | 115 | 138 | 65° | 6 hrs. (dark, formaldehyde odor). | 8.20 | 27.6 | 17.4 | 55 |
| 2 | 31.2 | 144 | 138 | 65° air (100 ml.) flow rt | 1 hr. 45' (light) | 16.48 | 30.9 | 4.2 | 64.9 |
| 3 | 31.2 | 115 | 138 | 65° air (50 ml.) flow rt | 1 hr. 20' (light) | 19.25 | 23.10 | 3.91 | 72.8 |
| 4 | 31.2 | 115 | 138 | 65° air 200 ml./min | 52' | 17.3 | 23.8 | 2.13 | 73.80 |
| 5 | 31.2 | 115 | 138 | 65° air 200 ml./min. discount aft. 20'. | 52' | 17.79 | 23.7 | 2.3 | 73.5 |

Experiment 1 was conducted in the absence of air and demonstrates the diminution in the yield of Rose Oxide and the increase in the formation of citronellyl acetate that takes place under these conditions. Experiment 2 shows the results that are obtained when the conditions are substantially the preferred conditions of the process. Experiment 3 indicates the decrease in yield of Rose Oxide that is obtained as the amount of air employed is decreased. Experiment 4 indicates the decrease in Rose Oxide formation as the amount of air employed is increased beyond the optimal level. Experiment 5 indicates rangement in an alpha position to the double bond in said citronellol compound to take place thereby forming an intermediate compound which spontaneously cyclizes, neutralizing said cyclized compound with a soluble alkali to form said Rose Oxide and recovering said Rose Oxide from the reaction medium.

2. A process for the preparation of Rose Oxide which comprises reacting a saturated, unsubstituted lower aliphatic carboxylic acid with a citronellol compound in the presence of lead tetroxide which causes allylic acetoxylation in an alpha position to the double bond in said citronellol compound to take place thereby forming an intermediate compound which spontaneously deacetoxylates and cyclizes to form the desired Rose Oxide, neutralizing the cooled reaction medium and recovering the Rose Oxide therefrom.

3. A process for the preparation of cis and trans 2-(2'-methyl-1'-propenyl)-4-methyltetrahydropyran which comprises reacting acetic acid with citronellol at a temperature in the range of about 60° C. to about 90° C. in the presence of an oxygen containing gas and lead tetroxide until substantially all of the lead tetroxide has reacted with said acetic acid thereby causing an allylic rearrangement in an alpha position to the double bond in said citronellol to take place thereby forming an intermediate compound which spontaneously deacetoxylates and cyclizes to form said methyltetrahydropyran, cooling the reaction medium, neutralizing said cyclized compound with a soluble alkali and recovering said methyltetrahydropyran from the reaction medium.

4. A process for the preparation of Rose Oxide which comprises reacting at a temperature of about 60 to about 90° C., a saturated, unsubstituted lower carboxylic acid with citronellol in the presence of an oxygen containing gas and lead tetroxide thereby causing allylic acetoxylation in an alpha position to the double bond in said citronellol to take place, thereby forming an intermediate compound which spontaneously deacetoxylates and cyclizes to form the desired Rose Oxide, cooling the reaction medium, neutralizing the cooled reaction medium and recovering the Rose Oxide therefrom.

5. A process for the preparation of Rose Oxide which comprises reacting acetic acid with citronellol in the presence of lead tetroxide and an oxygen containing gas at a temperature of about 65–68° C., maintaining this temperature for about 15 minutes to about 6 hours, cooling the reaction medium, neutralizing the cooled reaction medium with a soluble alkali and recovering the Rose Oxide therefrom.

6. A process for the preparation of Rose Oxide which comprises mixing citronellol and lead tetroxide, adding acetic acid to the reaction mixture over a period of about 5 minutes to about 6 hours and maintaining the reaction mixture at about 60–70° C. for about 15 minutes to about 6 hours until substantially all of the lead tetroxide has reacted with said acetic acid to form lead tetraacetate thereby causing an allylic acetoxylation in an alpha position to the double bond in said citronellol to take place thus forming an intermediate compound which spontaneously deacetoxylates and cyclizes to form the desired Rose Oxide, cooling the reaction medium, diluting the medium with water, neutralizing the medium with sodium hydroxide, and recovering the Rose Oxide therefrom.

7. A process for the prepartion of Rose Oxide which comprises mixing citronellol and lead tetroxide, adding acetic acid to the reaction mixture over a period of about 15 minutes to 1 hour, introducing an oxygen containing gas into the reaction medium, maintaining the reaction temperature at about 65–68° C. for about 15 minutes to about 2½ hours until all of the lead tetroxide has reacted with the acetic acid to form lead tetraacetate which causes an allylic acetoxylation in an alpha position to the double bond in said citronellol to take place thereby forming an intermediate compound which spontaneously deacetoxylates and cyclizes, allowing the reaction medium to cool, diluting the reaction medium with water, neutralizing the cooled reaction medium with a soluble alkali, and recovering the Rose Oxide therefrom.

8. A process for the preparation of Rose Oxide which comprises reacting a citronellol compound with a saturated, unsubstituted lower aliphatic carboxylic acid in the presence of a compound selected from the group consisting of tertiary butyl hydroperoxide and tertiary butyl peracetate which causes allylic hydroxylation in an alpha position to the double bond in said citronellol compound to take place thereby forming an intermediate compound which spontaneously dehydroxylates and cyclizes, neutralizing the reaction medium and recovering Rose Oxide therefrom.

9. A process for the preparation of Rose Oxide which comprises reacting citronellol with a saturated, unsubstitued lower aliphatic carboxylic acid in the presence of tertiary butyl hydroperoxide and cuprous chloride, maintaining the temperature at about 60–90° C. for about 1–5 hours, cooling the reaction medium, neutralizing said reaction medium with a soluble alkali and recovering Rose Oxide therefrom.

10. A process for the preparation of Rose Oxide which comprises adding acetic acid and cuprous chloride to citronellol at a temperature below 90° C., adding to said reaction medium tertiary butyl hydroperoxide, heating said reaction medium at a temperature of 60–90° C. for a period of about 1–5 hours, cooling said reaction medium, neutralizing said medium with a soluble alkali and recovering the Rose Oxide from said reaction medium.

11. A process for the preparation of Rose Oxide which comprises heating acetic acid, cuprous chloride and citronellol at a temperature below 90° C., adding to said reaction medium a compound selected from the group consisting of tertiary butyl hydroperoxide and tertiary butyl peracetate, introducing an oxygen containing gas into said reaction medium, heating said reaction medium at a temperature of 60–90° C. for a period of 1–5 hours, cooling said reaction medium, neutralizing said medium with a soluble alkali and recovering the Rose Oxide from said reaction medium.

12. A process for the preparation of Rose Oxide which comprises heating a mixture of acetic acid, cuprous chloride and citronellol to a temperature of about 65–68° C., adding tertiary butyl hydroperoxide to said reaction medium, heating the reaction medium to about 80° C. for about 1–3 hours, cooling the reaction medium, neutralizing said reaction medium with a dilute alkali, and recovering Rose Oxide from the reaction medium.

13. A process for the preparation of Rose Oxide which comprises heating a mixture of acetic acid, cuprous chloride and citronellol to a temperature of about 65–68° C., adding tertiary butyl hydroperoxide to said reaction mixture, introducing an oxygen containing gas into said reaction medium, heating the reaction medium to about 80° C. for about 1–5 hours, cooling the reaction medium, neutralizing said reaction medium with a dilute alkali and recovering Rose Oxide from the reaction medium.

References Cited in the file of this patent

Seidel et al.: Helvetica Chimica Acta, vol. 42, pp. 1830–1844 (1959).

Seidel et al.: Helvetica Chimica Acta, vol. 44, pp. 598–606 (1961).

Naves et al.: Helvetica Chimica Acta, vol. 44, pp. 1867–1872 (1961).

Naves et al.: Societe Chimique de France, Sec. 5, pp. 645–647 (1961).

Ohloff et al.: Angewandte chemie, vol. 73, page 578 (1961).